US010552997B2

(12) United States Patent
Stroila et al.

(10) Patent No.: US 10,552,997 B2
(45) Date of Patent: Feb. 4, 2020

(54) DATA AWARE INTERFACE CONTROLS (71) Applicant: HERE GLOBAL B.V., Eindhoven (NL)

(72) Inventors: Matei Stroila, Chicago, IL (US); Bill Gale, Oak Park, IL (US); Tiffany Barkley, Oakland, CA (US)

(73) Assignee: HERE GLOBAL B.V., Eindhoven (NL)

( * ) Notice: Subject to any disclaimer, the term of this patent is extended or adjusted under 35 U.S.C. 154(b) by 327 days.

(21) Appl. No.: 15/387,704

(22) Filed: Dec. 22, 2016

(65) Prior Publication Data
US 2018/0181285 A1 Jun. 28, 2018

(51) Int. Cl.
G06F 3/048 (2013.01)
G06T 11/20 (2006.01)
G06F 3/0484 (2013.01)

(52) U.S. Cl.
CPC ........ *G06T 11/206* (2013.01); *G06F 3/04847* (2013.01); *G06F 2203/04806* (2013.01)

(58) Field of Classification Search
None
See application file for complete search history.

(56) References Cited

U.S. PATENT DOCUMENTS

| 7,671,868 B2 | 3/2010 | Morita et al. |
| 9,086,791 B2 | 7/2015 | Ishak et al. |
| 2007/0273694 A1* | 11/2007 | Dobyns ................ G01R 13/02 345/440.1 |
| 2012/0137238 A1 | 5/2012 | Abeln |
| 2013/0215079 A1 | 8/2013 | Johnson et al. |
| 2013/0222420 A1* | 8/2013 | Shanka et al. |
| 2014/0215379 A1* | 6/2014 | Purdy et al. |

(Continued)

FOREIGN PATENT DOCUMENTS

WO  WO 2014/194251 A2  12/2014

OTHER PUBLICATIONS

Eick, Stephen G., "Data Visualization Sliders", IUIST '94 Proceedings of the 7th annual ACM symposium on User interface software and technology Nov. 2-4, 1994, Marina del Rey, California, United States. pp. 119-120.

(Continued)

Primary Examiner — William C Trapanese
(74) Attorney, Agent, or Firm — Alston & Bird LLP (57) ABSTRACT Methods, apparatus, and computer program products are provided in accordance with an example embodiment in order to allow for user interaction with a graphical representation of a set of data using one or more interface controls, wherein the graphical representation of the data and the interface control(s) are rendered to a display device. In example embodiments, information identifying data to be displayed is received. One or more interesting data points within the data to be displayed are identified. One or more interesting data windows are defined based on the identified interesting data points. A mapping is defined from a set of control position of an interface control to values of a variable of the data. The interface control corresponds to the variable. A graphical representation of the data and the interface control are rendered to a display device for user interaction with the graphical representation of the data.

18 Claims, 5 Drawing Sheets (56) References Cited

U.S. PATENT DOCUMENTS

2014/0247240 A1* 9/2014 Sinclair et al.
2015/0112844 A1* 4/2015 Labuszewski ......... G06Q 40/04
  705/37
2015/0331586 A1 11/2015 Benayon et al.

OTHER PUBLICATIONS

Global Majic Software, "Global Majic Slider", ComponentSource®, Copyright 1996-2017, 3 pages, retrieved from < https://www.componentsource.com/product/global-majic-slider/about > on Apr. 5, 2017.

Goan, Terrance, et al., "Supporting Thorough Knowledge Discovery with Data-Aware Visualizations", Proceedings of the $2^{nd}$ International Conference on Information Fusion, Fusion '99, Jul. 6-8, 1999, Sunnyale, California, retrieved from < http://fusion.isif.org/proceedings/fusion99CD/C-071.pdf? > on Apr. 5, 2017, 5 pages.

The Qt Company, "QAbstractSlider Class | Qt Widgets 5.8", retrieved from < http://doc.qt.io/qt-5/qabstractslider.html > on Apr. 5, 2017, 21 pages.

Unknown Contributors, "Density-Aware Sliders", *GitHub*, posted by dda5794 on Sep. 24, 2012, 4 pages, retrieved from <https://github.com/hcilab-um/DataAwareSliders/blob/master/CHI Paper - final.pdf> on Apr. 5, 2017.

\* cited by examiner

DATA AWARE INTERFACE CONTROLS

TECHNOLOGICAL FIELD

Example embodiments relate to interactive data displays. In particular, example embodiments generally relate to interactive graphical user interface data displays having data aware interface controls.

BACKGROUND

In various contexts, data may be provided for display through a data interface, for example, on a computer screen. The data interface may comprise various interface controls that a user may use to interact with the data. An example common interface control is a slider. For example, a slider may allow a user to control a bounded data variable by translating the position of the slider handle into a value. Generally, this translation is done via a linear transform that maps the range of the data variable ultimately into the range of the slider positions on the data interface. Due to the discrete nature of the screen position, this translation results in a uniform sampling of the data variable range. The uniform sampling translates into a constant step size of the slider. However, in various circumstances, the step size may be too coarse for the desired level of user interaction with the data.

BRIEF SUMMARY

Example embodiments allow users to define what comprises interesting data within a data set and then view and interact with a graphical representation of the data set such that the user may have a richer interaction with data in the vicinity of an interesting data point. For example, an interface control may correspond to a variable of the data. The interface control may comprise a set of control positions, each control position corresponding to a value of the variable. A mapping may be defined between the set of control positions and a set of variable values such that a user may interact more richly with the data in the vicinity of data points identified as interesting data points. For example, the mapping of the set of control positions to the set of variable values may be defined such that the step size of the variable values is non-uniform. Various other features are provided for an in-depth analysis of interesting data points of a data set.

Methods, apparatus, and computer program products are provided in accordance with an example embodiment in order to allow for user interaction with a graphical representation of a data set using one or more interface controls, wherein the graphical representation of the data set and the one or more interface controls are rendered to a display device. In example embodiments, information identifying data to be displayed is received. One or more interesting data points within the data to be displayed are identified. One or more interesting data windows are defined based on the identified interesting data points. A mapping is defined from a set of control positions of an interface control to values of a variable of the data. The interface control corresponds to the variable. A graphical representation of the data and the interface control are rendered to a display device for user interaction with the graphical representation of the data, in accordance with the defined mapping.

In accordance with an example embodiment, a method is provided. The method comprises receiving information identifying data to be displayed; identifying one or more interesting points within the data to be displayed; and defining one or more interesting data windows based on the identified interesting data points. The method further comprises defining a mapping from a set of control positions of an interface control to values of a variable of the data, the interface control corresponding to the variable; and rendering a graphical representation of the data and the interface control to a display device for user interaction with the graphical representation of the data, in accordance with the defined mapping.

In example embodiments, a step size used to define the mapping is finer within one of the one or more interesting data windows than it is outside of the one or more interesting data windows. In example embodiments, the mapping is defined such that each control position of the set of control positions is mapped to a data point within an interesting data window.

In example embodiments, the method further comprises receiving user input indicating a change in the position of a control handle of the interface control from a first position to a second position; and adjusting the rendering of the data based on the second position and the defined mapping. In example embodiments, the method further comprises determining whether the second position corresponds to a data point within one of the one or more interesting data windows, based on the defined mapping; and providing haptic or audible feedback in response to the received user input, the haptic feedback being based on the result of the determining of whether the second position corresponds to a data point within one of the one or more interesting data windows. In example embodiments, the method further comprises in response to determining that the second position corresponds to a data point within one of the one or more interesting data windows, based at least in part on the defined mapping, re-rendering the data to the display device to provide an inset of the data within the one of the one or more interesting data windows. In example embodiments, the inset provides a zoomed in view of a graphical representation of the data within the one of the one or more interesting data windows. In example embodiments, the inset provides contextual information corresponding to the data within the one of the one or more interesting data windows. In example embodiments, the adjusting of the rendering of the data further comprises adjusting the zoom level at which the data is rendered based on a result of determining whether the second position corresponds to a data point within one of the one or more interesting data windows.

In example embodiments, the user interface control is a slider corresponding to a variable of the data and wherein the first and second positions correspond to a first data point and a second data point of the data, the first data point corresponding to a value of the variable of the data corresponding to the first position and the second data point corresponding to a value of the variable of the data corresponding to the second position. In example embodiments, the interesting points within the data comprise at least one of a local maximum within the data, a local minimum within the data, a local maximum of a derivative of the data, a local minimum of a derivative of the data, a modified data point within the data, or a flagged data point within the data. In example embodiments, the interface control does not have a uniform scale. In example embodiments, the one or more interesting data points are identified based on intrinsic statistics of the data.

In example embodiments, the rendering of the graphical representation of the data and the interface control to the display device further comprises rendering a second interface control to the display device, the second interface control corresponding to a zoom control. In example embodiments, the method further comprises receiving user input indicating user selection of a third position, the third position being a position of the second interface control; determining whether the second position corresponds to a data point within one of the one or more interesting data windows; selecting a zoom step size based on the result of the determining of whether the second position corresponds to a data point within one of the one or more interesting data windows; and adjusting the rendering of the data based on the selected zoom step size and the third position. In example embodiments, a step size used to define the mapping varies in an inversely proportionally to a local first derivative of the data with respect to the variable.

According to another aspect of the present invention, an apparatus specifically configured to at least allow for user interaction with a graphical representation of a data set using one or more interface controls, wherein the graphical representation of the data set and the one or more interface controls are rendered to a display device, is provided. In an example embodiment, the apparatus comprises at least one processor and at least one memory storing computer program code. The at least one memory and the computer program code are configured to, with the processor, cause the apparatus to at least receive information identifying data to be displayed; identify one or more interesting points within the data to be displayed; and define one or more interesting data windows based on the identified interesting data points. The at least one memory and the computer program code are further configured to, with the processor, cause the apparatus to at least define a mapping from a set of control positions of an interface control to values of a variable of the data, the interface control corresponding to the variable; and render a graphical representation of the data and the interface control to a display device for user interaction with the graphical representation of the data, in accordance with the defined mapping.

In example embodiments, a step size used to define the mapping is finer within one of the one or more interesting data windows than it is outside of the one or more interesting data windows. In example embodiments, the mapping is defined such that each control position of the set of control positions is mapped to a data point within an interesting data window.

In example embodiments, the at least one memory and the computer program code are further configured to, with the processor, cause the apparatus to at least receive user input indicating a change in the position of a control handle of the interface control from a first position to a second position; and adjust the rendering of the data based on the second position and the defined mapping. In example embodiments, the at least one memory and the computer program code are further configured to, with the processor, cause the apparatus to at least determine whether the second position corresponds to a data point within one of the one or more interesting data windows, based on the defined mapping; and provide haptic or audible feedback in response to the received user input, the haptic feedback being based on the result of the determining of whether the second position corresponds to a data point within one of the one or more interesting data windows. In example embodiments, the at least one memory and the computer program code are further configured to, with the processor, cause the apparatus to at least, in response to determining that the second position corresponds to a data point within one of the one or more interesting data windows, based at least in part on the defined mapping, re-render the data to the display device to provide an inset of the data within the one of the one or more interesting data windows. In example embodiments, the inset provides a zoomed in view of a graphical representation of the data within the one of the one or more interesting data windows. In example embodiments, the inset provides contextual information corresponding to the data within the one of the one or more interesting data windows. In example embodiments, the at least one memory and the computer program code are further configured to, with the processor, cause the apparatus to the adjust of the rendering of the data by adjusting the zoom level at which the data is rendered based on a result of determining whether the second position corresponds to a data point within one of the one or more interesting data windows.

In example embodiments, the user interface control is a slider corresponding to a variable of the data and wherein the first and second positions correspond to a first data point and a second data point of the data, the first data point corresponding to a value of the variable of the data corresponding to the first position and the second data point corresponding to a value of the variable of the data corresponding to the second position. In example embodiments, the interesting points within the data comprise at least one of a local maximum within the data, a local minimum within the data, a local maximum of a derivative of the data, a local minimum of a derivative of the data, a modified data point within the data, or a flagged data point within the data. In example embodiments, the interface control does not have a uniform scale. In example embodiments, the one or more interesting data points are identified based on intrinsic statistics of the data.

In example embodiments, the at least one memory and the computer program code are further configured to, with the processor, cause the apparatus to render a second interface control to the display device, the second interface control corresponding to a zoom control. In example embodiments, the at least one memory and the computer program code are further configured to, with the processor, cause the apparatus to at least receive user input indicating user selection of a third position, the third position being a position of the second interface control; determine whether the second position corresponds to a data point within one of the one or more interesting data windows; select a zoom step size based on the result of the determining of whether the second position corresponds to a data point within one of the one or more interesting data windows; and adjust the rendering of the data based on the selected zoom step size and the third position. In example embodiments, a step size used to define the mapping varies in an inversely proportionally to a local first derivative of the data with respect to the variable.

According to yet another aspect of the present invention, a computer program product for allowing user interaction with a graphical representation of a data set using one or more interface controls, wherein the graphical representation of the data set and the one or more interface controls are rendered to a display device, is provided. In an example embodiment, the computer program product comprises at least one non-transitory computer-readable storage medium having computer-executable program code instructions stored therein. The computer-executable program code instructions comprise program code instructions configured to receive information identifying data to be displayed; identify one or more interesting points within the data to be displayed; and define one or more interesting data windows based on the identified interesting data points. The computer-executable program code instructions further comprise program code instructions configured to define a mapping from a set of control positions of an interface control to values of a variable of the data, the interface control corresponding to the variable; and render a graphical representation of the data and the interface control to a display device for user interaction with the graphical representation of the data, in accordance with the defined mapping.

In example embodiments, a step size used to define the mapping is finer within one of the one or more interesting data windows than it is outside of the one or more interesting data windows. In example embodiments, the mapping is defined such that each control position of the set of control positions is mapped to a data point within an interesting data window.

In example embodiments, the computer-executable program code instructions further comprise program code instructions configured to receive user input indicating a change in the position of a control handle of the interface control from a first position to a second position; and adjust the rendering of the data based on the second position and the defined mapping. In example embodiments, the computer-executable program code instructions further comprise program code instructions configured to determine whether the second position corresponds to a data point within one of the one or more interesting data windows, based on the defined mapping; and provide haptic or audible feedback in response to the received user input, the haptic feedback being based on the result of the determining of whether the second position corresponds to a data point within one of the one or more interesting data windows. In example embodiments, the computer-executable program code instructions further comprise program code instructions configured to, in response to determining that the second position corresponds to a data point within one of the one or more interesting data windows, based at least in part on the defined mapping, re-render the data to the display device to provide an inset of the data within the one of the one or more interesting data windows. In example embodiments, the inset provides a zoomed in view of a graphical representation of the data within the one of the one or more interesting data windows. In example embodiments, the inset provides contextual information corresponding to the data within the one of the one or more interesting data windows. In example embodiments, the computer-executable program code instructions further comprise program code instructions configured to the adjust of the rendering of the data by adjusting the zoom level at which the data is rendered based on a result of determining whether the second position corresponds to a data point within one of the one or more interesting data windows.

In example embodiments, the user interface control is a slider corresponding to a variable of the data and wherein the first and second positions correspond to a first data point and a second data point of the data, the first data point corresponding to a value of the variable of the data corresponding to the first position and the second data point corresponding to a value of the variable of the data corresponding to the second position. In example embodiments, the interesting points within the data comprise at least one of a local maximum within the data, a local minimum within the data, a local maximum of a derivative of the data, a local minimum of a derivative of the data, a modified data point within the data, or a flagged data point within the data. In example embodiments, the interface control does not have a uniform scale. In example embodiments, the one or more interesting data points are identified based on intrinsic statistics of the data.

In example embodiments, the computer-executable program code instructions further comprise program code instructions configured to render a second interface control to the display device, the second interface control corresponding to a zoom control. In example embodiments, the computer-executable program code instructions further comprise program code instructions configured to receive user input indicating user selection of a third position, the third position being a position of the second interface control; determine whether the second position corresponds to a data point within one of the one or more interesting data windows; select a zoom step size based on the result of the determining of whether the second position corresponds to a data point within one of the one or more interesting data windows; and adjust the rendering of the data based on the selected zoom step size and the third position. In example embodiments, a step size used to define the mapping varies in an inversely proportionally to a local first derivative of the data with respect to the variable.

In accordance with yet another example embodiment of the present invention, an apparatus is provided. The apparatus comprises means for receiving information identifying data to be displayed. The apparatus further comprises means for identifying one or more interesting points within the data to be displayed. The apparatus further comprises means for defining one or more interesting data windows based on the identified interesting data points. The apparatus further comprises means for defining a mapping from a set of control positions of an interface control to values of a variable of the data, the interface control corresponding to the variable. The apparatus further comprises means for rendering a graphical representation of the data and the interface control to a display device for user interaction with the graphical representation of the data.

BRIEF DESCRIPTION OF THE DRAWINGS

Having thus described certain example embodiments in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Example embodiments of the present invention provide methods, systems, apparatuses, and computer program products for rendering a data interface comprising a graphical representation of data and one or more interface controls to a display wherein the interface controls are configured to allow a user to interact with the data in a data aware manner. For example, a typical interface control uses a uniform step size which may be too coarse for exploring some of the interesting features of a data set. Example embodiments of the present invention provide a user with the ability to more finely control the user experience of a graphical representation of a data set in regions of the data set that comprise interesting data points. For example, the scale that relates the various selectable positions of the interface controls may be non-uniform and may vary such that a user may interact in a more in-depth manner with interesting data points and the data in the vicinity of the interesting data points. For example, in the vicinity of interesting data points, the scale of the interface control may have a smaller step size than the scale of the interface control far from an interesting data point.

Figure 1:
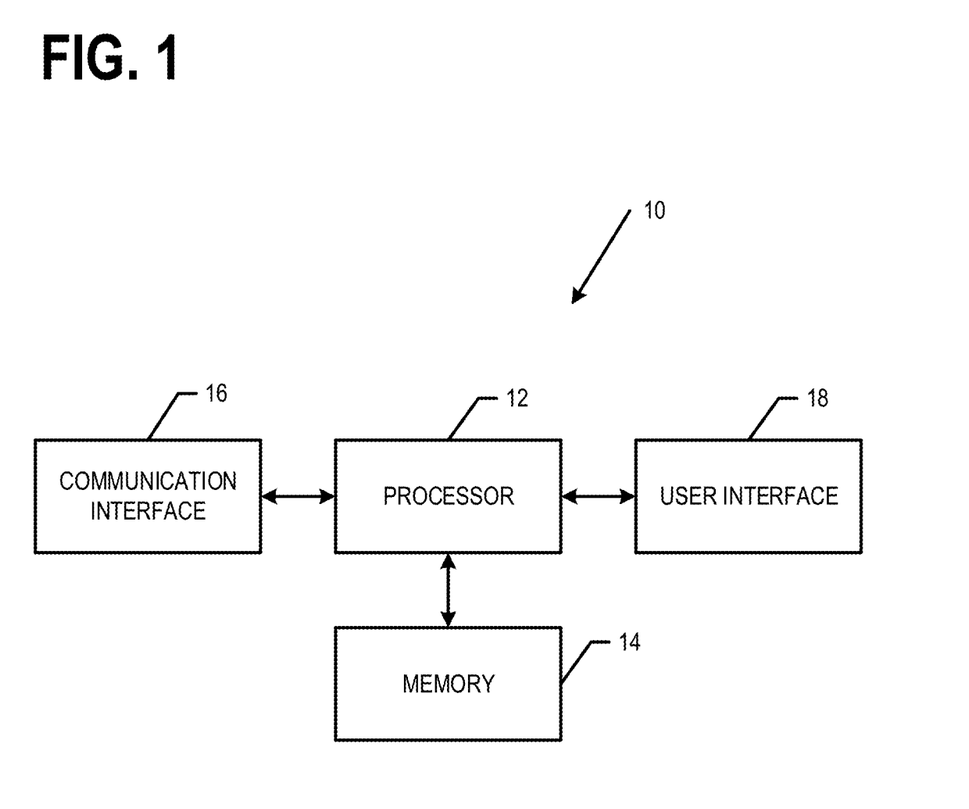
FIG. 1 is a block diagram of an apparatus that may be specifically configured in accordance with an example embodiment.

FIG. 1 provides an illustration of an example apparatus that can be specifically configured to provide a data interface having data aware interface controls, in accordance with embodiments of the present invention. In example embodiments, an apparatus 10 may comprise components similar to those shown in the example apparatus 10 diagrammed in FIG. 1.

In example embodiments, the apparatus 10 may comprise a processor 12, memory 14, a communications interface 16, a user interface 18, and/or other components configured to perform various operations, procedures, functions or the like described herein). For example, the processor 12 may be configured to render a data interface to the user interface 18. For example, the user interface 18 may comprise a computer screen, monitor, television, projected display, and/or the like configured to display a data interface for user interaction.

Example embodiments of the apparatus 10 are described in more detail below with respect to FIG. 1. In example embodiments, the apparatus 10 may be in communication with one or more computing entities through one or more wired or wireless networks. In example embodiments, such computing entities may comprise a processor (e.g., similar to processor 12), memory (e.g., similar to memory 14), a communication interface (e.g., similar to communication interface 16), a user interface (e.g., similar to user interface 18), and/or the like.

II. Exemplary Operation

Figure 2:
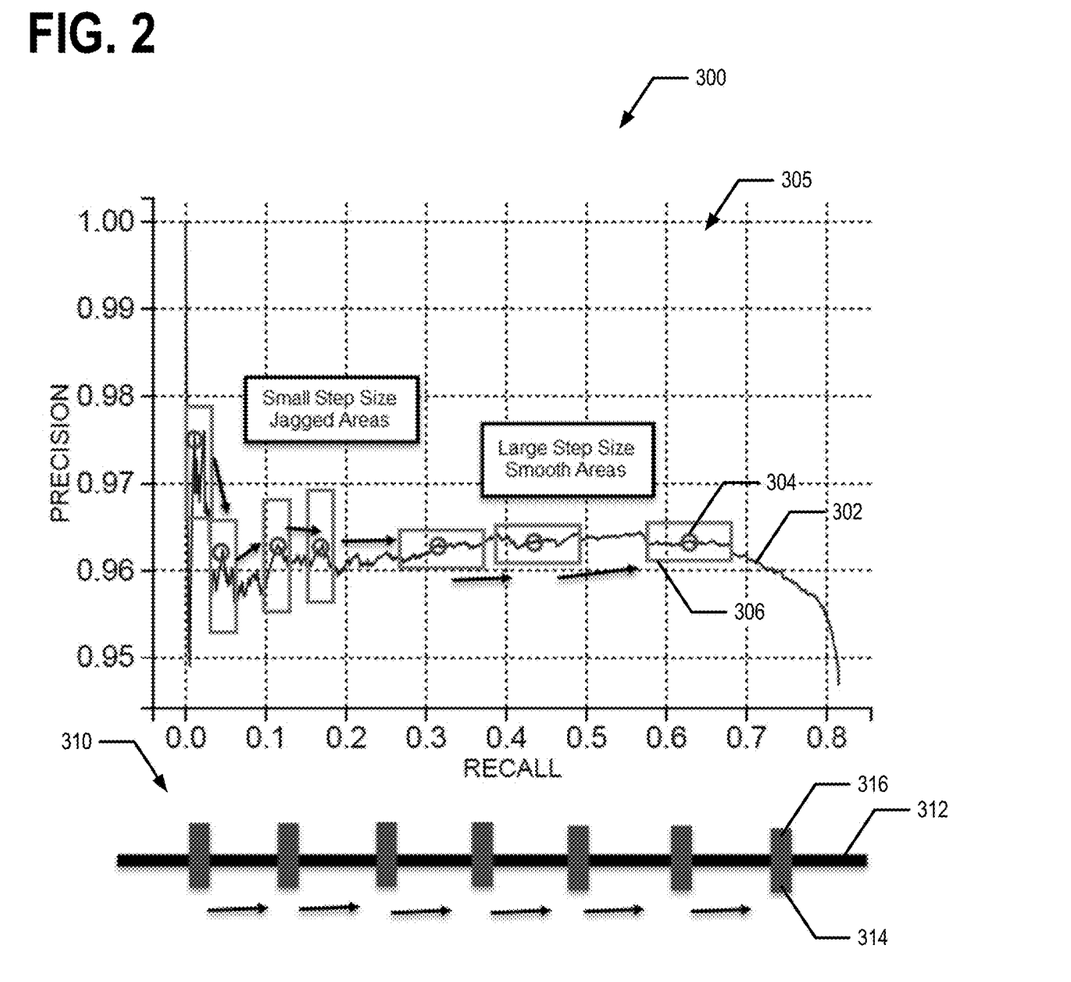
FIGS. 2 and 3 provide example views of a data interface, in accordance with an example embodiment.
Figure 3:
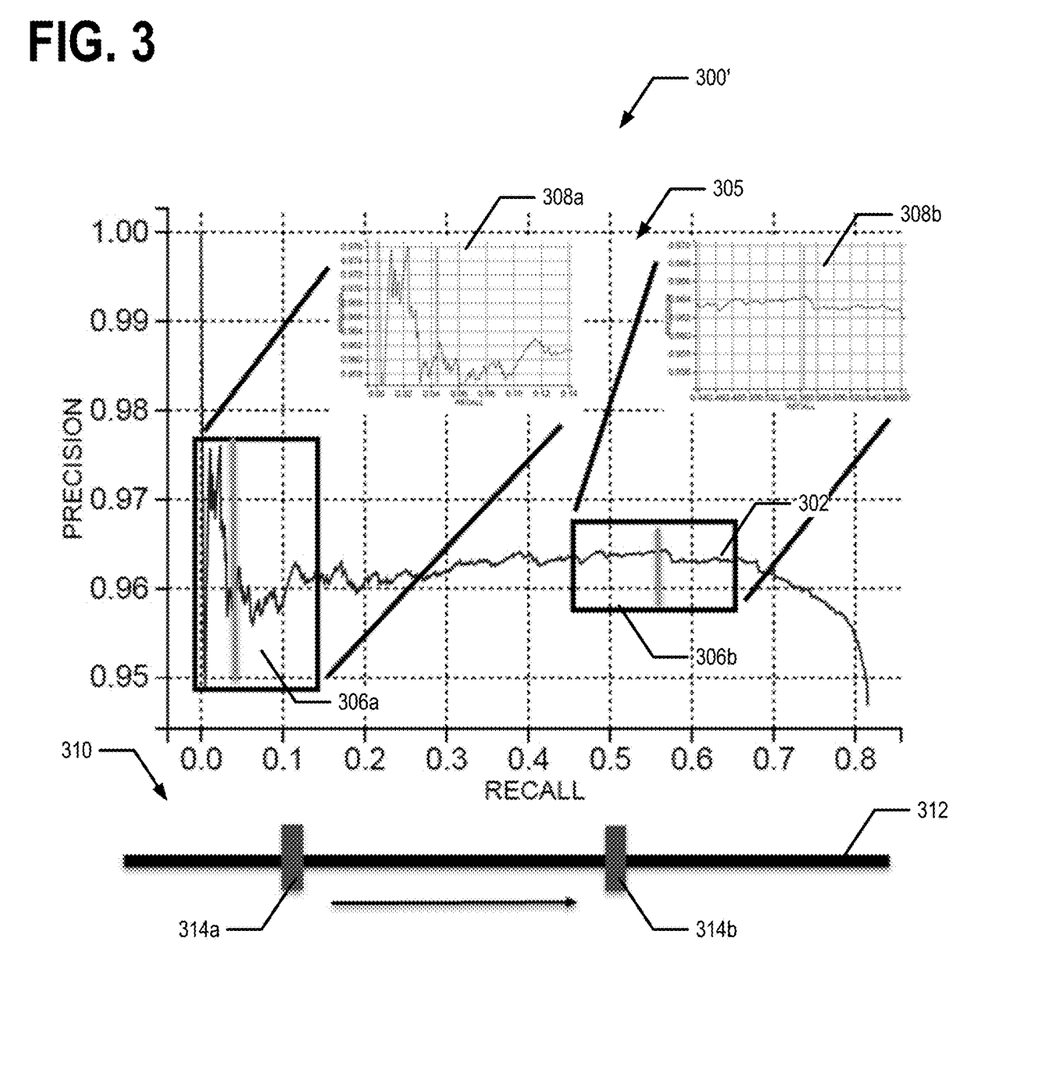

In example embodiments, the apparatus 10 may be configured to provide a data interface through the user interface 18 thereof. In some example embodiments, the apparatus 10 may be configured to provide a data interface through the user interface (e.g., display) of another computing entity or apparatus (e.g., a client computing entity, a computing entity in electronic communication with the apparatus 10 through, for example, a wired or wireless network, and/or the like). As shown in FIGS. 2 and 3, in example embodiments, the data interface 300, 300' may comprise a graphical representation of data 305 (e.g., a histogram; line plot; x-y plot; two or three-dimensional scatter plot; and/or other one-dimensional, two-dimensional, three-dimensional and/or higher dimensional graphical data representations) and one or more interface controls 310. For example, the graphical representation of the data 305 may comprise a plot representing the data 302. The data may include one or more interesting data points 304. An interesting data window 306 may be defined about one or more interesting data points 304. In some embodiments, the data interface 300' may include an inset 308 (e.g., 308a, 308b) showing a zoomed in or magnified view of a graphical representation of the data 302 within an interesting data window 306 (e.g., 306a, 306b) and/or related contextual information/data when a control handle 316 of the interface controls 310 is in a control position 314 corresponding to a data point that is within the interesting data window. For example, when the control handle 316 is at position 314a corresponding to a data point located within interesting data window 306a, the inset 308a may be provided.

As noted above, data interface 300, 300' may comprise one or more interface controls 310 that are configured to allow the user to interact with the graphical representation of the data 305. For example, the one or more interface controls may comprise one or more sliders, dials, and/or interface control mechanisms having a plurality of user-selectable positions. In particular, at least one of the one or more interface controls 310 are configured to allow the user to interact with the graphical representation of the data 305 in a data aware manner. In example embodiments, the interface controls 310 may comprise a plurality of positions 314 (e.g., 314a, 314b) distributed along a range of control positions 312. A control handle 316 indicates the current control position 314 of the interface control 310. While the range of control positions 312 may appear to be a continuous range of control positions 314, due to the discrete nature of screen position, the range of control positions is a discrete set of control positions. A mapping maps each of the control positions to a variable value (or zoom or magnification level, rotation angle, and/or the like) of the data and/or the graphical representation of the data 305. The mapping may be non-uniform such that the user may interact with interesting data points 304 and data in the vicinity thereof (e.g., data within the interesting data window 306 comprising the interesting data point 304) in a more in-depth manner than data points that are located far from an interesting data point (e.g., outside of an interesting data window 306). For example, an interface control 310 may correspond to a bounded variable of the data and allow the user to translate through the bounded range of the variable and view a graphical representation of the data by adjusting the position of the control handle 316.

In example embodiments, the mapping between the discrete positions 314 of the interface control 310 and values of the variable of the data does not use a uniform scale or step size. In particular, the scale or step size in the vicinity of an interesting data point 304 (e.g., within an interesting data window 306) is smaller than the scale or step size far from an interesting data point 304 (e.g., outside of an interesting data window 306). Thus, in example embodiments, a larger number of the user control positions correspond to values of the variable of the data that are within interesting data windows 306 than would be the case if a uniform scale or step size were utilized. Thus, as a user interacts with the data interface 300, 300' (e.g., using a mouse, joystick, touchscreen, and/or input device of and/or in communication with the user interface 18) the user is able to more richly interact with data located within the interesting data windows 306.

In example embodiments, an indication of data to be rendered may be received. In some embodiments, an indication of what kind of data points may be considered interesting data points may also be received. For example, data points that are local minimums, local maximums, and/or local minimums or maximums in the first, second, or a higher derivative of the data may be considered interesting data points 304 in some embodiments. In an example embodiment, an interesting point 304 may be a point in a scatter plot having a high density of data points located thereat (e.g, a high density point). In some embodiments, data points that have been modified from an earlier instance of the data or that have been flagged may be considered interesting data points 304. For example, the interface control 310 could track to places where data has been added, modified, or deleted relative to a prior instance of the data. An analysis of the data may then be performed to identify the interesting data points 304. Once, the interesting data points 304 have been identified, an interesting data window 306 is defined about at least one of the interesting data points 304. The interesting data window 306 is defined such that the corresponding interesting data point 304 is within the interesting data window 306. In an example embodiment, two or more interesting data points 304 may be located within a single interesting data window 306. A mapping of interface control 310 positions 314 to the variable of the data or other aspect of the data or graphical representation thereof may be defined. For example, the interface control 310 may correspond to a variable of the data, a zoom level, a rotation angle of a two or higher dimensional graphical data rendering, and/or the like. The mapping is defined such that the scale or step size used within the one or more interesting data windows 306 is smaller than the scale or step size used outside of the interesting data windows 306. The data interface 300, 300' may then be rendered to the user interface 18 to provide the user with the graphical representation of the data 305 and the one or more interface controls 310.

In example embodiment, user interaction with the interface control 310 may be received. For example, the user may select a particular position 314 of the interface control 310. For example, user input indicating movement of the control handle 316 from the first position (e.g., 314a) to the second position (e.g., 314b) may be received. For example, user input indicating a change in the position 314 of the interface control 310 from a first position to a second position may be received. In example embodiments, the graphical representation of the data 305 may then be re-rendered based on the selected second position. For example, the rendering of the graphical representation of the data 305 may be adjusted or modified based on the selected second position. In example embodiments, the second position may be selected by the user, for example, releasing a mouse click when the control handle 316 is at the second position. In some example embodiments, the second position may be selected momentarily and/or in passing by the user as the control handle 316 is moved through the second position. The frequency with which the graphical representation of the data 305 and/or the data interface 300, 300' is re-rendered, for example as the user is actively providing input related to movement of the control handle 316) may be determined based on various aspects or properties of the apparatus 10 (e.g., speed of processor 12, graphics processing speed of the user interface 18, and/or the like).

In some embodiments, if the second position corresponds to a data point located within an interesting data window 306, the zoom level of the graphical representation of the data 305 may be modified. In some embodiments, if the second position corresponds to a data point located within an interesting data window, the graphical representation of the data 305 may be adjusted, modified, or re-rendered to display an inset 308 (e.g., 308a, 308b) providing a graphical representation of at least some of the data within interesting data window 306 (e.g., 306a, 306b) corresponding to the second position. In some embodiments, the inset 308 (e.g., 308a, 308b) may be configured to provide a more zoomed-in or magnified view of at least some of the data within the interesting data window 306 (306a, 306b) than the remainder of the graphical representation of the data 305. In some embodiments, the inset 308 (e.g., 308a, 308b) may provide contextual information related to the data set or related to the data within the interesting data window 306.

In some embodiments, as a user provides input moving the control handle 316 of the interface control 310 from a first position (e.g., 314a) to a second position (e.g., 314b), haptic feedback may be provided based on whether or not the second position corresponds to a data point within an interesting data window 306. For example, if the user is interacting with the user interface 18 using a haptic feedback enabled mouse, the mouse may vibrate more strongly or with more intensity when the second position corresponds to a data point within an interesting data window 306 compared to when the second position corresponds to a data point that is not within an interesting data window 306. In some embodiments, no haptic feedback is provided when the second position is not within an interesting data window 306. In some embodiments, the zoom or magnification level with which the re-rendered, adjusted, and/or modified graphical representation of the data 305 is displayed and/or provided is determined based on whether or not the data point corresponding to the second position is within an interesting data window 306 or not. In some embodiments two or more interface controls 310 may be provided by the data interface 300, 300'. For example, one or more interface controls 310 may each correspond to a variable of the data, an interface control 310 may correspond to a zoom or magnification level corresponding to one or more variables of the data, one or more interface controls 310 may each correspond to rotation angle about a defined rotation axis, and/or the like. Thus, a user may interact with the data through multiple data aware interface controls 310 in some embodiments.

Figure 4:
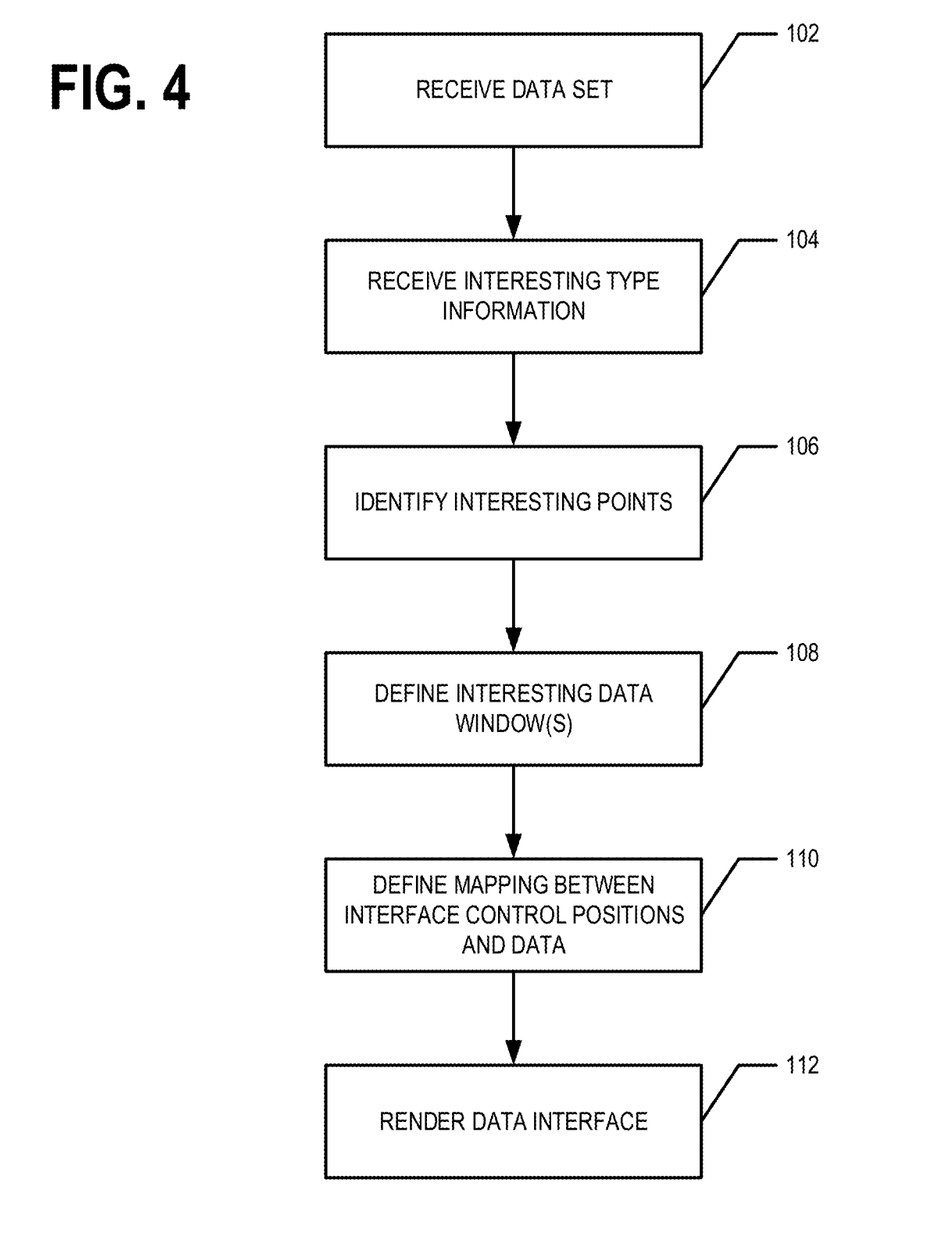
FIGS. 4 and 5 are each a flowchart illustrating operations performed, such as by the apparatus of FIG. 1, in accordance with an example embodiment.

FIG. 4 provides a flowchart illustrating processes and operations performed, such as by the apparatus 10, to render a data interface 300, 300' to a display (e.g., user interface 18). Starting at block 102, a data set is received. For example, a user may provide input (e.g., through user interface 18 or a user interface of a computing entity in communication with the apparatus 10) selecting a data set, providing a data set, and/or the like for which a graphical representation is to be provided. For example, the apparatus 10 may receive a data set and/or user selection of a data set. For example, the apparatus 10 may comprise means, such as the processor 12, communication interface 16, user interface 18, and/or the like, for receiving a data set and/or user selection of a data set for which a graphical representation is to be provided for.

At block 104, interesting type information may be received. For example, the interesting type information indicates what kind(s) of data points are to be considered interesting data points 304. For example, the apparatus 10 may receive interesting type information. For example, the apparatus 10 may comprise means, such as processor 10, communication interface 16, user interface 18, and/or the like, for receiving interesting type information. For example, a user may provide interesting type information via a user interface (e.g., user interface 18). In another example, a file, folder, database or other data structure storing the data set may comprise interesting type information. In another example, the data set may be associated with a data type (e.g., vehicle speed data, data pertaining to a geographical area, precision-recall data, map information, data type A, data type B, and/or other data type). Each data type may be associated with interesting type information pertaining to that data type. In example embodiments, the interesting type information may indicate that data points that are local maxima; local minima; local maxima in one or more derivatives of the data; local minima in one or more derivatives of the data; local maxima in a selected derivative of the data; local minima in a selected derivative of the data; data points having a particular value or a value within a particular range of values; data that has been modified from an earlier instance of the data, data that has been flagged, and/or the like. In some embodiments, the interesting type information may indicate the maximum number of data points that may be identified as interesting data points 304. For example, the interesting type information may indicate that the ten local maxima having the greatest values are to be identified as interesting data points 304. In another example, the interesting type information may indicate that the fifteen local minima corresponding to the lowest values of a variable A are to be identified as interesting data points 304. The interesting type information may be determined, defined, and/or the like based on the intended analysis of the data.

At block 106, interesting data points 304 are identified. For example, the apparatus 10 may identify the interesting data points 304. For example, the apparatus 10 may comprise means, such as the processor 12 and/or the like, for identifying the interesting data points 304. For example, one or more interesting data points 304 may be identified within the data set based on the interesting type information. For example, a statistical analysis of the data set may be performed to identify maxima and/or minima in the data, maxima and/or minima in one or more derivatives of the data, and/or the like. For example, the identification of the one or more interesting data points 304 may be based on a statistical or other analysis of the data set and/or the interesting type information. In an example embodiments, a table of the identified interesting data points may be generated and/or stored (e.g., in memory 14).

At block 108, after identifying the one or more interesting data points 304, or possibly in response thereto, one or more interesting data windows 306 are defined. For example, the apparatus 10 may define one or more interesting data windows 306. For example, the apparatus 10 may comprise means, such as the processor 12 and/or the like, for defining one or more interesting data windows 306. For example, an interesting data window may be defined by defining the boundary of the interesting data window 306. The boundary of an interesting data window may be defined such that at least one interesting data point 304 is within the boundaries of the interesting data window 306. In example embodiments, each interesting data window 306 may comprise at least one interesting data point 304. In some embodiments an interesting data window 306 may include two or more interesting data points 304. For example, an interesting data window 306 may be defined about each interesting data point 304 and if two of the interesting data windows 306 overlap, the two interesting data windows 306 may be merged into one interesting data window 306. The merged interesting data window would then include at least two interesting data points 304 therein.

In example embodiments, an interesting data window 306 may be defined to include a configurable number of data points such that the interesting data window 306 is centered on the corresponding interesting data point. In another example, an interesting data window 306 may extend from the data point closest to the interesting data point 304 from below having a particular value or a particular derivative of a particular value to the data point closest to the interesting data point from above having the same or a different particular value or particular derivative of a particular value. For example, an interesting data window 306 may extend from the data point closest to the interesting data point 304 from one side (e.g., the left) having a particular value or a particular derivative of a particular value to the data point closest to the interesting data point 304 on the other side (e.g., the right) having the same or a different particular value or a particular derivative of a particular value. In example embodiments, the one or more interesting data windows 306 may be determined based on the table of interesting data points 304 that may be generated and/or stored at block 106. In example embodiments, a table comprising the one or more defined interesting data windows 306, the boundaries of the one or more defined interesting data windows 306 and/or other information/data that identifies which data points are within an particular interesting data window 306 is generated and/or stored (e.g., in memory 14).

At block 110, a mapping between interface control positions 314 and a variable of the data or the graphical representation of the data is defined. As noted, above, an interface control 310 may correspond to a variable of the data or a zoom or magnification level, a rotation about a defined rotation axis, and/or the like. Each position 314 of the interface control 310 may be mapped to a corresponding variable value, rotation angle, zoom or magnification level, and/or the like. For example, the apparatus 10 may define a mapping between the interface control positions and a variable of the data or a variable of the graphical representation of the data. For example, the apparatus 10 may comprise means, such as the processor 12 and/or the like, for defining a mapping between the interface control positions and a variable of the data or a variable of the graphical representation of the data. For example, the interface control positions 314 may be a set of control positions comprising a predetermined number of positions. The predetermined number of positions may be based on a particular screen resolution and/or other aspect of the user interface 18 or other display. In an example embodiment, each element of the set of control positions 314 may be mapped to a specific variable value, data point, rotation angle, and/or the like. Thus, each element of the set of control positions may be mapped to an element in a subset of variable values (e.g., a variable of the data or the graphical representation of the data).

As there are generally not enough elements in the set of control positions to match each variable value or ration angle to a control position, a scale or step size is used to determine which variable value or rotation angle to which a control position corresponds. In example embodiments, the mapping between the discrete positions of the interface control 310 and values of the variable of the data or rotation angle does not use a uniform scale or step size. In particular, the scale or step size applied within interesting data windows 306 is smaller than the scale or step size used outside of an interesting data window 306. This allows a user to step through the data within the interesting data window 306 more slowly and with more refinement than the data located outside of an interesting data window 306. Thus, in example embodiments, a larger number of the user control positions correspond to values of the variable of the data that are within interesting data windows 306 than would be the case if a uniform scale or step size were utilized. Thus, as a user interacts with the data interface 300, 300' (e.g., using a mouse, joystick, touchscreen, and/or input device of and/or in communication with the user interface 18) the user is able to more richly interact with data located within the interesting data windows 306. For example, the step size of the interface control through the variable of the data may be vary inverse proportionally to the smoothness and/or linearly of the data with respect to the variable of the data. For example, the mapping may be defined such that the step size between adjacent elements of the set of control positions varies with an inverse proportionality to the smoothness and/or linearity of the data with respect to the variable of the data corresponding to the interface control 310. For example, the mapping may be defined such that the step size between adjacent elements of the set of control positions varies with inverse proportionality to a measure of the jaggedness, smoothness, and/or linearity (e.g., first derivative, and/or the like) of the data with respect to the variable of the data corresponding to the interface control 310. In an example embodiment, the mapping may be defined such that a user may only interact with data within an interesting data window 306. For example, the mapping may be defined such that every position 314 of the interface control 310 corresponds to a data point within an interesting data window 306. In some example embodiments, the scale or step size within an interesting data window 306 may vary based on the smoothness or jaggedness of the data within the interesting data window 306.

In example embodiments, the data interface 300, 300' may comprise multiple interface controls 310. For example, one or more interface controls 310 may each correspond to a variable of the data. In another example, one or more interface controls 310 may each correspond to a rotation angle around a particular rotation axis and may be used to rotate the graphical representation of the data about the corresponding particular rotation axis. In another example, an interface control 310 may correspond to a zoom or magnification level with respect to one or more variables of the data. In an example embodiment, a second interface control 310 may be linked to a first interface control 310. For example, a first interface control may correspond to a variable of the data and the second interface control may correspond to a zoom or magnification level. If the control handle 316 of the first interface control 310 is at a position corresponding to a data point within an interesting data window 306, the scale or step size with which the second interface control 310 changes the zoom or magnification level may be different than the scale or step size of the second interface control 310 when the control handle 16 of the first interface control 310 is at a position corresponding to a data point not within an interesting data window 306. For example, an interesting window zoom or magnification level scale or step size may be defined and a different non-interesting window zoom or magnification level scale or step size may be defined. If the control handle 316 of the first interface control 310 is at a position 314 corresponding to a data point within an interesting data window 306, the interesting window zoom or magnification level scale or step size may be used. If the control handle 316 of the first interface control 310 is at a position 314 corresponding to a data point that is not within an interesting data window 316, the non-interesting window zoom or magnification level scale or step size may be used. In example embodiments, the interesting window zoom or magnification level scale or step size may allow the user to interact with the data in a more refined manner than the non-interesting window zoom or magnification level scale or step size.

In example embodiments, after the mapping from the control positions 314 to the data is defined, code for controlling, interacting with, and/or rendering the data interface 300, 300' for the data based on the defined mapping(s), defined interesting data window(s), and/or identified interesting points 304 may be generated and/or stored. For example the apparatus 10 may generate and/or store code for controlling, interacting with, and/or rendering the data interface 300, 300'. For example, the apparatus 10 may comprise means, such as the processor 12, memory 14, and/or the like, for generating and/or storing code for controlling, interacting with, and/or rendering the data interface 300, 300' for the data set. For example, the table of interesting data points 304 and/or interesting data windows 306 may be stored. Thus, in example embodiments, the analysis described above need only be completed the first time the user wishes to view the data set through the data interface 300, 300' or when/if the user wishes to change the interesting type information. The code for controlling, interacting with, and/or rendering the data interface 300, 300' for the data set may be stored in association with the data set, may reference the data set, be referenced by the data set, and/or the like, such that when the data set is to be rendered to the display (e.g., the user interface 18), the code may be accessed and executed. Moreover, the code for controlling, interacting with, and/or rendering the data interface 300, 300' for the data set may be provided to one or more other computing entities (e.g., through one or more wired or wireless networks) for display of the data interface 300, 300' by a display of the one or more other computing entities. In an example embodiment, a common code may be used to control, interact with, and/or render data interfaces 300, 300' corresponding to various data sets, and the table of interesting data points 304 and/or interesting data windows 306 may be loaded for the data set of interest to provide a data interface 300, 300' that is uniquely formatted for the data set being displayed. Thus, in some embodiments, the table of interesting data points 304 and/or interesting data windows 306 may be generated and/or stored rather than generating and/or storing code.

At block 112, the data interface 300, 300' is rendered to a display (e.g., of the user interface 18). For example, the apparatus 10 (or another computing entity) may render the data interface 300, 300' to a display (e.g., the user interface 18). For example, the apparatus 10 may comprise means, such as processor 12, user interface 18, and/or the like, for rendering the data interface 300, 300' to a display. For example, the data interface 300, 300' may be rendered to the display based on the table of interesting data windows 306 and/or the table of interesting data points 304. For example, the data interface 300, 300' may be rendered to the display in accordance with the defined mapping. Once the data interface 300, 300' is rendered to the display, a user may interact with the data (e.g., using a data input device of the user interface 18 and/or the like). For example, after the data interface 300, 300' is rendered to the display, a user may change the position of the control handle 316 of one or more interface controls 310 to adjust and/or modify the view of the graphical representation of the data 305.

In example embodiments, an interface control 310 may be coupled with data aware tool-tips. For example, a user may use an interface control 310 to scroll through a graphical representation of data 305, and text or other pop up information may be provided as the user scrolls through data points identified as interesting data points 304 but not when the user scrolls through data points that are not identified as interesting data points 304, and/or the like.

Figure 5:
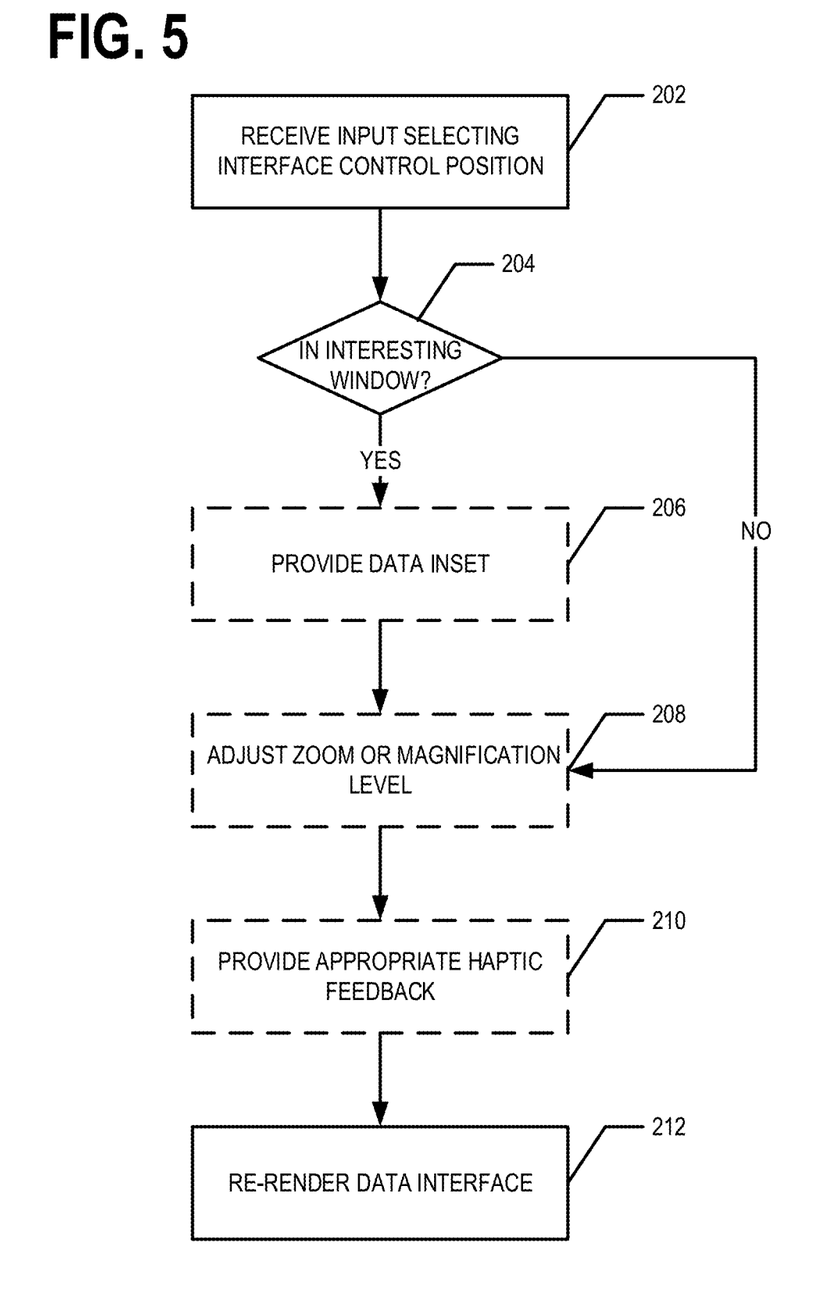

FIG. 5 provides a flowchart illustrating processes and operations performed, such as by the apparatus 10, to adjust, modify, re-render, and/or the like the graphical representation of the data 305 through the use of one or interface controls 310. Starting at block 202, after the data interface 300, 300' is rendered to the display (e.g., of the user interface 18), user input indicating user selection of a second position 314 for an interface control 310 is received. For example, the apparatus 10 may receive user input indicating user selection of a second position 314 of an interface control 310. For example, the apparatus 10 may comprise means, such as processor 12, user interface 18, and/or the like for receiving input indicating user selection of a second position 314 of an interface control 310. For example, a user may wish to move the control handle 316 of an interface control 310 from a first position to a second position. Using a mouse, joystick, touchscreen, and/or other input device, a user may provide input indicating user selection of the second position 314 of the interface control 310. In some example embodiments, the user selection of second position 314 may be a momentary selection as the control handle 316 moves through the second position in-route to a desired position and from the first position. In some examples, the second position is the desired position. For example, in some embodiments, the data interface 300, 300' may be adjusted, modified, re-rendered, and/or the like in real-time (or near real-time) as user input is received changing the position of the control handle 316 of the interface control 310. In some embodiments, if the control handle 316 passes through a position corresponding to an interesting data point, the control handle 316 may "stick" for a short time (e.g., a fraction of a second or a second) such that the user may be aware of passing through an interesting data point 304 and/or so that a user may more easily select an interesting data point 304.

At block 204, it may be determined if the second position corresponds to a data point that is within an interesting data window 306. For example, the apparatus 10 may determine if the second position corresponds to a data point that is within an interesting data window 306. For example, the apparatus 10 may comprise means, such as the processor 12 and/or the like, for determining if the second position corresponds to a data point that is within an interesting data window 306. For example, the mapping from the control positions 314 to the variable of the data or the variable of the graphical representation of the data may be referenced, used, and/or the like to determine if the second position corresponds to a data point that is within an interesting data window 306. In some embodiments, the mapping of the set of control positions to the variable of the data of the variable of the graphical interface of the data may occur on the fly based on the predetermined table of interesting points 304 and/or interesting data windows 306.

In response to determining at block 204 that the second position corresponds to a data point that is within an interesting data window 306, a data inset 308 (e.g., 308a, 308b), is provided in some embodiments, at block 206. For example, the apparatus 10 may provide a data inset 308 (e.g., 308a, 308b). For example, the apparatus 10 may comprise means, such as processor 12, user interface 18, and/or the like, for providing a data inset 308. For example, the second position may be position 314b in FIG. 3, which corresponds to a data point within the interesting data window 306b. The data insert 308b may be provided, in some example embodiments, in response to the user selection of the second position 314b. For example, the inset 308b may be a zoomed in or magnified portion of the graphical representation of the data 305 corresponding to the data within the interesting data window 306b. In some example embodiments, the inset 308 (e.g., 308a, 308b) may provide additional information. For example, the inset 308b may provide contextual information/data corresponding to the data within the interesting data window 306b. For example, the contextual information/data may comprise map information/data, geospatial data relative to data expressed on the curve, and/or other contextual information/data as appropriate for the application.

At block 208, the zoom or magnification level of the graphical representation of the data 305 may be adjusted or modified based on the result of the determination of whether the user-selected second position of the interface control 310 corresponds to a data point located within an interesting data window 306. For example, the apparatus 10 may adjust or modify the zoom or magnification level of the graphical representation of the data 305 based on the result of the determination of whether the user-selected second position corresponds to a data point within an interesting data window 306. For example, the apparatus 10 may comprise means, such as processor 10, user interface 18, and/or the like, for adjusting or modifying the zoom or magnification level of the graphical representation of the data 305 based on the result of the determination of whether the user-selected second position corresponds to a data point within an interesting data window 306.

At block 210, haptic feedback may be provided to the user, in some example embodiments. For example, the apparatus 10 may provide haptic feedback to the user based on the result of the determination of whether the user-selected second position of the interface control 310 corresponds to a data point located within an interesting data window 306. For example, the apparatus 10 may comprise means, such as the processor 10, user interface 18, and/or the like, for providing haptic feedback to the user based on the result of the determination of whether the user-selected second position of the interface control 310 corresponds to a data point located within an interesting data window 306. For example, in response to the determination of whether the second position of the interface control 310 corresponds to a data point located within an interesting data window 306, a haptic feedback enabled user interaction device (e.g., a haptic feedback enabled mouse or joystick, and/or the like) may provide real-time haptic feedback to the user regarding whether the second position does or does not correspond to an interesting data window 306. For example, a first level of intensity of haptic feedback (or no haptic feedback) may be provided if it is determined that the second position does not correspond to a data point within an interesting data window 306 and a second, different level of intensity of haptic feedback may be provided if it is determined that the second position does correspond to a data point within an interesting data window 306. The second level of intensity may be greater than the first level of intensity. Similarly, audible feedback could be provided with a higher pitch, greater volume, more rapid pace (e.g., in the case of a beeping audible feedback), and/or the like audible feedback corresponding to positions corresponding to data points within an interesting data window 306 compared to positions corresponding to data points that are not within an interesting data window 306. Various types of feedback may be provided to the user to indicate the result of the determination of whether the second position of the interface control 310 corresponds to a data point located within an interesting data window 306. In another example embodiment, the intensity of the feedback (e.g., haptic, audio, or other feedback) may vary with the distance of the second position from an interesting data point 304, boundary of a data window 306, and/or the like.

At block 212, the data interface 300, 300' is adjusted, modified, re-rendered, and/or the like to reflect the user-selection of the second position of the interface control 310. For example, the apparatus 10 may adjust, modify, and/or re-render the data interface 300, 300' to reflect the user-selection of the second position of the interface control 310. For example, the apparatus 10 may comprise means, such as the processor 12, user interface 18, and/or the like, for adjusting modifying, and/or re-render the data interface 300, 300' to the display (e.g., of the user interface 18) to reflect the user-selection of the second position of the interface control 310. For example, the data interface 300, 300' may be adjusted, modified, re-rendered, and/or the like to illustrate the control handle 316 at the second position of the interface control 310. For example, the data interface 300, 300' may be adjusted, modified, re-rendered, and/or the like to provide an inset 308 (e.g., 308a, 308b), adjust or modify the view (e.g., position within the bounded variable range corresponding to the interface control 310) of the graphical representation of the data 305, adjust or modify the zoom or magnification level of the graphical representation of the data 305, and/or the like to reflect the control handle 316 being positioned at the second position of the interface control 310. In some embodiments, the user may select the inset 308 (e.g., 308a, 308b) and a data interface 300, 300' corresponding to the data shown in the inset 308 may be rendered to the display.

In example embodiments, the data interface 300, 300' may comprise two or more interface controls 310. For example, a first interface control may correspond to a first variable of the data and the second interface control may correspond to a second variable of the data. Accordingly, an interesting data window 306 may be defined by a pair of variable ranges (e.g., one variable range corresponding to each of the first and second variable). For example, the boundary of the interesting data window 306 may be defined in both the first and second variables. In some such embodiments, two mappings may be defined between the set of control positions and the data for each interface control. For example, for the first interface control, a first mapping may be defined for when the control handle of the second interface control is in a position corresponding to an interesting data window according to the second variable and a second mapping may be defined for when the control handle of the second interface control is in a position that does not correspond to an interesting data window in the second variable. In some embodiments, a single mapping is defined for each interface control 310. It should be understood that teachings of the present invention may be applied to data sets having more than two variables. For example, teachings of the present invention may be applied to data sets having three, four, five, six, or more variables.

In example embodiments, the data interface 300, 300' may comprise two or more interface controls 310 wherein one of the interface controls corresponds to a zoom or magnification along at least one axis of the graphical representation of the data 305. In such embodiments, two scales or step sizes may be defined for the zoom or magnification interface control. For example, a first interface control may correspond to a variable of the data and the control handle 316 of the first interface control may be at a second position. A second interface control may correspond to a zoom or magnification level of the data and the control handle 316 of the second interface control may be moved to a user-selected third position. If the second position corresponds to a data point in an interesting data window 306, a first scale or step size may be used to zoom or magnify the graphical representation of the data 305 based on the user selection of the third position. If the second position corresponds to a data point that is not in an interesting data window 306, a second scale or step size may be used to zoom or magnify the graphical representation of the data 305 based on the user selection of the third position.

III. Example Apparatus

The apparatus 10 of an example embodiment may be embodied by or associated with a variety of computing devices including, for example, such as a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, a laptop, a desktop, mobile computing entity, a wearable computing entity, server, and/or other device that can perform computation-related functions, such as analysis of data and rendering of a data interface. In this regard, FIG. 1 depicts an apparatus 10 of an example embodiment that may be embodied by various computing devices including those identified above. As shown, the apparatus 10 of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 may be embodied by a computing device. However, in some embodiments, the apparatus 10 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may include a user interface 18 that may, in turn, be in communication with the processor 12 to provide output to the user, such as a data interface 300, 300', and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14 and/or the like).

The apparatus 10 may optionally include a communication interface 16. The communication interface may be any means such as a device or circuitry embodied in either hardware or a combination of hardware and software that is configured to receive and/or transmit data from/to a network and/or any other device, computing entity, or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 4 and 5 illustrate flowcharts of apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims.

In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving information identifying data to be displayed;
    identifying one or more interesting points within the data to be displayed;
    defining one or more interesting data windows based on the identified interesting data points;
    defining a mapping from a set of control positions of an interface control of an interactive data interface to values of a variable of the data, the interface control corresponding to the variable, wherein the interface control has a non-uniform step size; and
    rendering the interactive data interface comprising (a) a graphical representation of the data and (b) the interface control to a display device for user interaction with the graphical representation of the data via the interface control,
    wherein user selection of a particular position of the interface control via user interaction with the interactive data interface causes selection of a data point associated with a corresponding value of the variable based on the mapping.

2. A method according to claim 1, wherein the step size used to define the mapping is finer within one of the one or more interesting data windows than it is outside of the one or more interesting data windows.

3. A method according to claim 1, wherein the mapping is defined such that each control position of the set of control positions is mapped to a data point within an interesting data window.

4. A method according to claim 1, further comprising:
    receiving user input indicating a change in the position of a control handle of the interface control from a first position to a second position; and
    adjusting the rendering of the data based on the second position and the defined mapping.

5. A method according to claim 4, further comprising:
    determining whether the second position corresponds to a data point within one of the one or more interesting data windows, based on the defined mapping; and
    providing haptic or audible feedback in response to the received user input, the haptic or audible feedback being based on the result of the determining of whether the second position corresponds to a data point within one of the one or more interesting data windows.

6. A method according to claim 4, further comprising, in response to determining that the second position corresponds to a data point within one of the one or more interesting data windows, based at least in part on the defined mapping, re-rendering the data to the display device to provide an inset of the data within the one of the one or more interesting data windows.

7. A method according to claim 6 wherein the inset provides a zoomed in view of a graphical representation of the data within the one of the one or more interesting data windows.

8. A method according to claim 6 wherein the inset provides contextual information corresponding to the data within the one of the one or more interesting data windows.

9. A method according to claim 4, wherein the adjusting of the rendering of the data further comprises adjusting the zoom level at which the data is rendered based on a result of determining whether the second position corresponds to a data point within one of the one or more interesting data windows.

10. A method according to claim 1, wherein the user interface control is a slider corresponding to a variable of the data and wherein the first and second positions correspond to a first data point and a second data point of the data, the first data point corresponding to a value of the variable of the data corresponding to the first position and the second data point corresponding to a value of the variable of the data corresponding to the second position.

11. A method according to claim 1, wherein the user interface control corresponds to a viewing angle of the graphical representation of the data and wherein the first and second positions correspond to a first viewing angle of the graphical representation of the data and a second viewing angle of the graphical representation of the data.

12. A method according to claim 1, further comprising:
    determining that a user interface control is in a position corresponding to one of the one or more interesting data points;
    causing display of a data-aware tool tip.

13. A method according to claim 1, wherein the interesting points within the data comprise at least one of a local maximum within the data, a local minimum within the data, a local maximum of a derivative of the data, a local minimum of a derivative of the data, a modified data point within the data, or a flagged data point within the data.

14. A method according to claim 1, wherein the one or more interesting data points are identified based on intrinsic statistics of the data.

15. A method according to claim 1, wherein the rendering of the graphical representation of the data and the interface control to the display device further comprises rendering a second interface control to the display device, the second interface control corresponding to a zoom control; and the method further comprises:
    determining whether the second position corresponds to a data point within one of the one or more interesting data windows;
    selecting a zoom step size based on the result of the determining of whether the second position corresponds to a data point within one of the one or more interesting data windows;
    receiving user input indicating user selection of a third position, the third position being a position of the second interface control; and
    adjusting the rendering of the data based on the selected zoom step size and the third position.

16. A method according to claim 1, wherein the step size used to define the mapping varies in an inversely proportionally to a local first derivative of the data with respect to the variable.

17. An apparatus comprising at least one processor and at least one memory storing computer program code, the at least one memory and the computer program code are configured to, with the processor, cause the apparatus to at least:
- receive information identifying data to be displayed;
- identify one or more interesting points within the data to be displayed;
- define one or more interesting data windows based on the identified interesting data points;
- define a mapping from a set of control positions of an interface control of an interactive data interface to values of a variable of the data, the interface control corresponding to the variable, wherein the interface control has a non-uniform step size; and
- render the interactive data interface comprising (a) a graphical representation of the data and (b) the interface control to a display device for user interaction with the graphical representation of the data via the interface control,
- wherein user selection of a particular position of the interface control via user interaction with the interactive data interface causes selection of a data point associated with a corresponding value of the variable based on the mapping.

18. A computer program product comprising at least one non-transitory computer-readable storage medium having computer-executable program code instructions stored therein, the computer-executable program code instructions comprise program code instructions configured to:
- receive information identifying data to be displayed;
- identify one or more interesting points within the data to be displayed;
- define one or more interesting data windows based on the identified interesting data points;
- define a mapping from a set of control positions of an interface control of an interactive data interface to values of a variable of the data, the interface control corresponding to the variable, wherein the interface control has a non-uniform step size; and
- render the interactive data interface comprising (a) a graphical representation of the data and (b) the interface control to a display device for user interaction with the graphical representation of the data via the interface control,
- wherein user selection of a particular position of the interface control via user interaction with the interactive data interface causes selection of a data point associated with a corresponding value of the variable based on the mapping.

* * * * *